United States Patent
Novitchenko et al.

(10) Patent No.: US 10,356,188 B2
(45) Date of Patent: Jul. 16, 2019

(54) DYNAMIC UPDATE OF TIPS ON A DEVICE

(71) Applicant: Apple Inc., Cupertino, CA (US)

(72) Inventors: Kirill Novitchenko, San Francisco, CA (US); Kyle W. Lu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 14/727,697

(22) Filed: Jun. 1, 2015

(65) Prior Publication Data
US 2016/0350135 A1  Dec. 1, 2016

(51) Int. Cl.
G06F 9/44 (2018.01)
H04L 29/08 (2006.01)
G06F 9/451 (2018.01)

(52) U.S. Cl.
CPC .............. *H04L 67/22* (2013.01); *G06F 9/453* (2018.02); *H04L 67/303* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 8,719,706 B2 | 5/2014 | Harris et al. | |
| 8,843,851 B1 | 9/2014 | Gotchy et al. | |
| 8,850,314 B2 | 9/2014 | Thompson | |
| 9,665,998 B1* | 5/2017 | Shields | G06Q 10/02 |
| 2002/0065884 A1* | 5/2002 | Donoho | G06F 17/3089 709/204 |
| 2004/0080542 A1* | 4/2004 | Bertram | G06F 17/30973 715/810 |
| 2010/0223059 A1* | 9/2010 | Huang | H04M 3/493 704/270.1 |
| 2010/0248689 A1* | 9/2010 | Teng | H04M 1/67 455/411 |
| 2012/0166945 A1 | 6/2012 | Roberts et al. | |
| 2012/0304116 A1* | 11/2012 | Donahue | G06F 3/04817 715/808 |
| 2013/0159851 A1 | 6/2013 | Pawar et al. | |
| 2014/0337791 A1* | 11/2014 | Agnetta | G06F 3/0481 715/784 |
| 2015/0067521 A1* | 3/2015 | Heo | G06F 3/1446 715/733 |
| 2016/0140204 A1* | 5/2016 | Brown | G06Q 10/101 707/602 |

* cited by examiner

*Primary Examiner* — Tuan S Nguyen
(74) *Attorney, Agent, or Firm* — Kilpatrick Townsend & Stockton LLP

(57) ABSTRACT

A query is sent from a client device to a server for tips to functionality of the client device. The query can include information, such as a device type, e.g., iPhone vs. iPad. The server can provide tips that are appropriate for the client device. The client device can provide additional filtering of the tips, e.g., based on current operating system and device properties, to provide available tips. The client device maintains a list of available tips, and manages the list such that only relevant tips are visible to the user.

24 Claims, 9 Drawing Sheets

DYNAMIC UPDATE OF TIPS ON A DEVICE

FIELD

The present disclosure relates generally to wireless electronic devices and in particular to providing tips, or suggestions, for functionality of a client device.

BACKGROUND

Many electronic computer devices are relatively complicated to operate and a user can expect to undergo a steep learning curve before becoming adept at using the device. Tips can be provided to a user to help a user understand the functionality of a device, e.g., a smartphone, tablet computing device, and the like. Tips can be provided in the form of a "Help" menu, or tips can be provided in a more subtle, context-driven tip display scheme. While such assistance can ease the difficulty for a user in learning the device operation, a static set of tips that are downloaded with an operating system (e.g., as a help function) are often not very helpful. Such static tips may not address the specific difficulty being faced by the device user. Moreover, it can be beneficial to get new tips periodically. Lastly, the set of tips that are most useful might not be static, e.g., they might change, as may occur when a new operating system is installed.

BRIEF SUMMARY

As disclosed herein, a server can provide an updated list of tips to a client device. The tips can be dynamically generated by the server and can be provided in response to a client device query (e.g., a query as a background process). The query can include certain information, such as a type of device, e.g., iPhone vs. iPad. The server can provide tips that are appropriate for the client device. The client device can provide additional filtering of the tips, e.g., based on current operating system and device properties, to provide available tips. The available tips can be browsed by a user or can be provided automatically, e.g., as a tip of the day. When browsing, more recent tips (i.e., newly created by the server) can be provided in a list, with more recent tips on top of the list. When the tip is provided automatically, the device can track whether the user has interacted with the tip functionality, and if not, the tips can be stopped or reduced from being provided automatically. Further, the device can track whether a tip has been provided before. A new tip might become available when new software (e.g., an application) has been downloaded or enabled at the client device. If the tip is newly installed on the available tip list, the new tip can be displayed toward a top of the list, even though the tip might have originally become available long before more recent tips.

More particularly, tips may be provided to a user of a client device by sending a query from the client device to a server for tips that relate to functionality of the client device. The query includes data that specifies a device type of the client device. The client device receives a first set of tips in response to the query, the first set being identified by the server as corresponding to the device type of the client device. One or more properties of the client device may be identified for filtering the first set of tips. The first set of tips may be filtered using the one or more properties to obtain a second set of available tips for the client device. The second set of available tips to a user may be displayed in response to a request to view tips.

A better understanding of the nature and advantages of embodiments of the present invention may be gained with reference to the following detailed description and the accompanying drawings.

DETAILED DESCRIPTION

Figure 1:
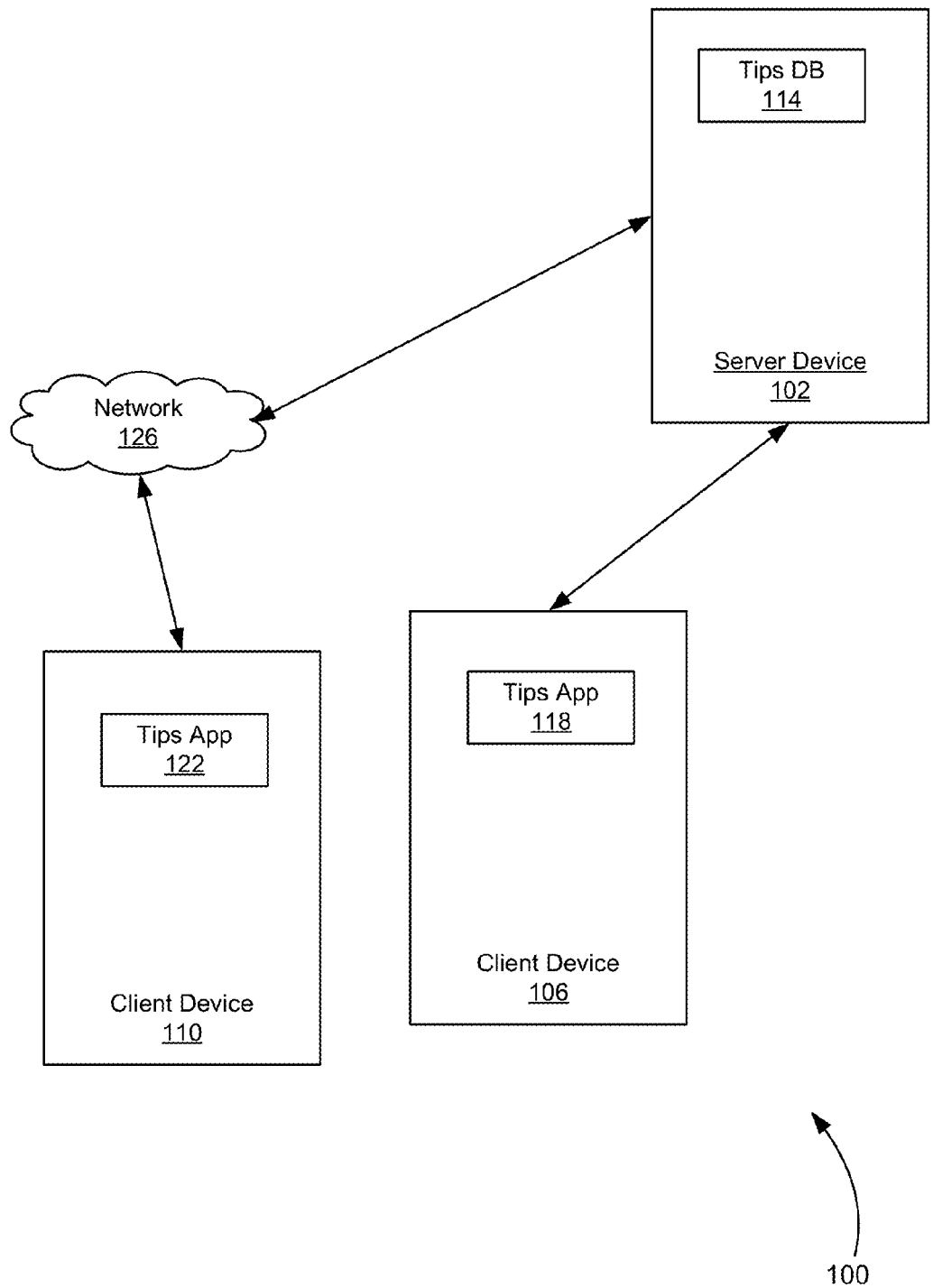
FIG. 1 is a block diagram of a system that performs a tips application functionality according to embodiments of the present invention.

Tips can be provided to a user to help the user understand the functionality of a computing device, e.g., a device such as a smartphone, a tablet computing device, and the like. As described herein, tips can be provided to user of a device in the form of a notification that appears on a lock screen or a static display state of a screen of the device. The tips can be provided from a tips server to the device, which is in a client device relationship with the tips server. The tips can be dynamically generated by the tips server and can be provided in response to a client device query (e.g., a query that is generated from a device application executing as a background process). The query can include certain information, such as a type of device, e.g., a smartphone vs. a tablet computer. The server can provide tips that are appropriate for the client device. The client device can provide additional filtering of the tips, e.g., based on current operating system and device properties, to provide available tips. Device properties may include, for example, operating system version number, installed applications, client device resources, and the like. A user of the client device can be made aware of a tip by a notification displayed on a lock screen display of the device. Interacting with the notification, such as by clicking or tapping on the screen notification, can launch the corresponding tip application and can initiate direct user execution of the tip application.

The available tips can be browsed by a user or can be provided automatically, e.g., as a tip of the day. When browsing, more recent tips (i.e., tips newly provided by the server) can be ordered in a list, with more recent tips on top of the list. When the tip is provided automatically, the device can track whether the user has interacted with the tip functionality, and if not, the tips can be stopped or reduced from being provided automatically. Further, the device can track whether a tip has been provided before. A new tip might become available when new software (e.g., an application) has been downloaded or enabled at the client device. If the tip is newly installed on the available tip list, the new tip can be displayed toward a top of the list, even though the tip might have originally become available long before more recent tips.

In accordance with embodiments, tips can be provided to a user of a client device by sending a query to a server for tips to functionality of the client device, the query specifying a device type of the client device. A first set of tips can be received, the first set being identified by the server as corresponding to the device type of the client device. One or more properties of the client device can be identified for filtering the first set, using the one or more properties to obtain a second set of available tips for the client device. The second set of available tips to a user may be displayed in response to a request to view tips.

In another aspect, the client device may periodically send a query to the server and may determine the second set of available tips. The client device may track a tip when the tip is initially on the second set of available tips. The device may identify a first tip as available at a first time, the first tip being generated by the server at a first generation time, and the device may identify a second tip as available at a second time, the second tip being generated by the server at a second generation time. Then, responsive to determining that the second time is more recent than the first time, the device may display the second tip higher on a list than the first tip, wherein the first generation time is before the second generation time.

I. Initiating Display of Tips and Device Operation

As noted above, tips are obtained at a client device from a tips server. A user can be informed of an available tip by a device notification, such as a notification alert on a lock screen of the client device. Interacting with the notification, such as by clicking or tapping on the screen notification, can launch the corresponding tip application and can initiate direct user execution of the tip application. The tip application on the client device can operate so as not to intrude on the user experience. Therefore, tip notifications can generally shown on a lock screen display of the client device, and some embodiments may not display tips on the lock screen unless the display is empty (i.e., no other alerts or notifications are being displayed on the lock screen).

A. System

FIG. 1 is a block diagram of a system 100 that obtains and displays tips on a client device. In FIG. 1, a system 100 includes a server device 102 that is communicatively coupled to client devices 106, 110. The devices 102, 106, 110 may be any kind of computing device capable of network communications, such as, for example, a desktop computer, a laptop, a tablet, a mobile phone (e.g., a Smartphone), a media player, a personal digital assistant (PDA), a gaming device, and the like. The client devices 106, 110 for example may comprise an "iPhone" or "iPod" device available from Apple Inc. of Cupertino, Calif., USA.

The server device 102 includes a tips database 114 that contains tips, or helpful hints and suggestions, for explanation and description of the functionality of various devices, including the client devices 106, 110. Each of the respective client devices 106, 110 includes a corresponding installed tips application 118, 122, respectively. The client devices may be coupled to the server device 102 via a direct connection, such as between the server 102 and the client device 106, or the client devices may be coupled to the server over a communications network 126, such as between the server 102 and the client device 110. The network 126 may be any kind of network such as, for example, a local area network (LAN), a wide area network (WAN) such as the Internet, or a combination thereof.

The client device may send a query to a server for tips that relate to functionality of the client device, functionality of applications installed on the client device, as well as tips regarding system updates and warnings. The query from the client device includes data that specifies a device type of the client device. Based on the received query, the server can retrieve relevant tips, that is, tips that match the client device, from a database, and can provide the tips to the client device. The client device receives a first set of tips in response to the query, the first set being identified by the server as corresponding to the device type of the client device. One or more properties of the client device may be identified for filtering the first set of tips, for greater granularity in identifying relevant tips. Thus, the first set of tips may be filtered using the one or more properties to obtain a second set of available tips for the client device. The second set of available tips to a user may be displayed in response to a request to view tips.

The tip server can provide an updated list of tips to a client device. The tips can be dynamically generated by the server in response to the client device query. The client device query can be initiated by a process in the client device that is not intrusive to the device operation (e.g., a query as a background process). The query can include predetermined information, such as a type of device, e.g., iPhone vs. iPad. The server can provide tips that are appropriate for the client device. The client device can provide additional filtering of the tips, e.g., accepting for availability only those tips that are based on current operating system and device properties. The available tips can be browsed by a user or can be provided automatically, e.g., as a tip of the day. When browsing, more recent tips (i.e., newly created by the server) can be provided in a list, with more recent tips on top of the list. When the tip is provided automatically, the device can track whether the user has interacted with the tip functionality, and if not, the tips can be stopped or reduced from being provided automatically. Further, the client device can track whether a tip has been provided to the device before. In addition, a new tip might become available when new software (e.g., an application) has been downloaded and installed or enabled at the client device. If the tip is newly installed on the available tip list, the new tip can be displayed toward the top of the list, even though the tip might have originally become available long before more recent tips were received.

B. Display Views

Figure 2:
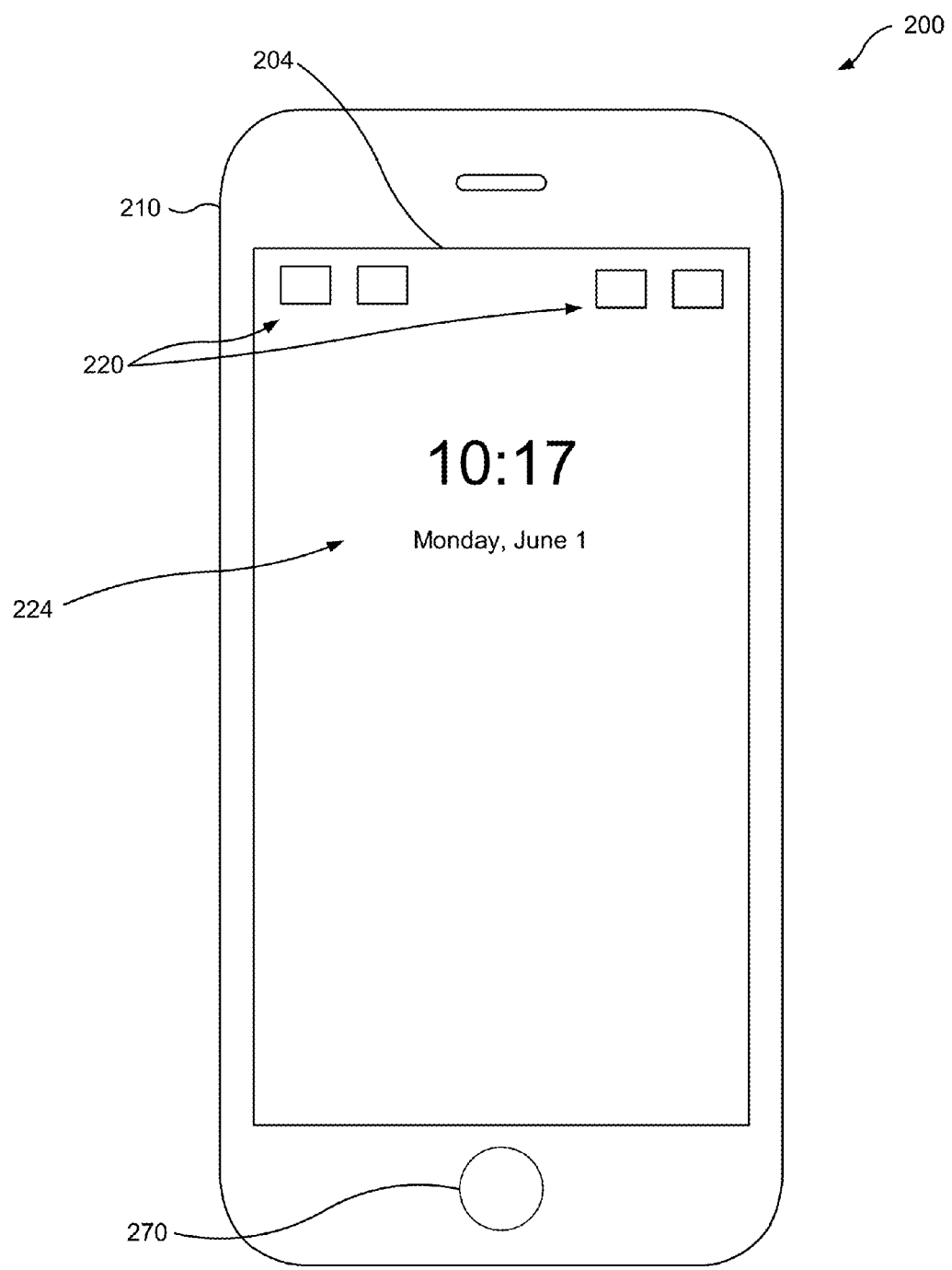
FIG. 2 is a representation of a client device displaying a lock screen view on the display screen according to embodiments of the present invention.

The operation of a client device in accordance with the disclosure herein will be better understood by explanation of the display views that are generated during device operation. FIG. 2 is a representation of a mobile device as described herein, showing its display screen with a depiction of a lock screen view on the display screen. FIG. 2 shows a client device 200 such as one of the client devices 106, 110 illustrated in FIG. 1. In the FIG. 2 example, the client device 200 is depicted as a smartphone, such as an iPhone from Apple, Inc., but other client devices may be substituted and may operate successfully in the system as described herein. The client device 200 includes a display screen 204 that comprises a touchscreen that is housed in the device body 210. At the top of the display screen are multiple icons 220, the details of which are omitted for simplicity of display. The icons typically show information such as battery charge, network connection, service provider, and the like. The lock screen view typically includes local information 224 such as time of day and day of week and date. In FIG. 2, the lock screen view is otherwise empty. The user may actuate a home button 270 to initiate display of notifications, alerts, and messages on the lock screen display during a standby, idle operation of the client device. During normal operation of the client device, the home button 270 may be used to return to a home display screen.

Figure 3:
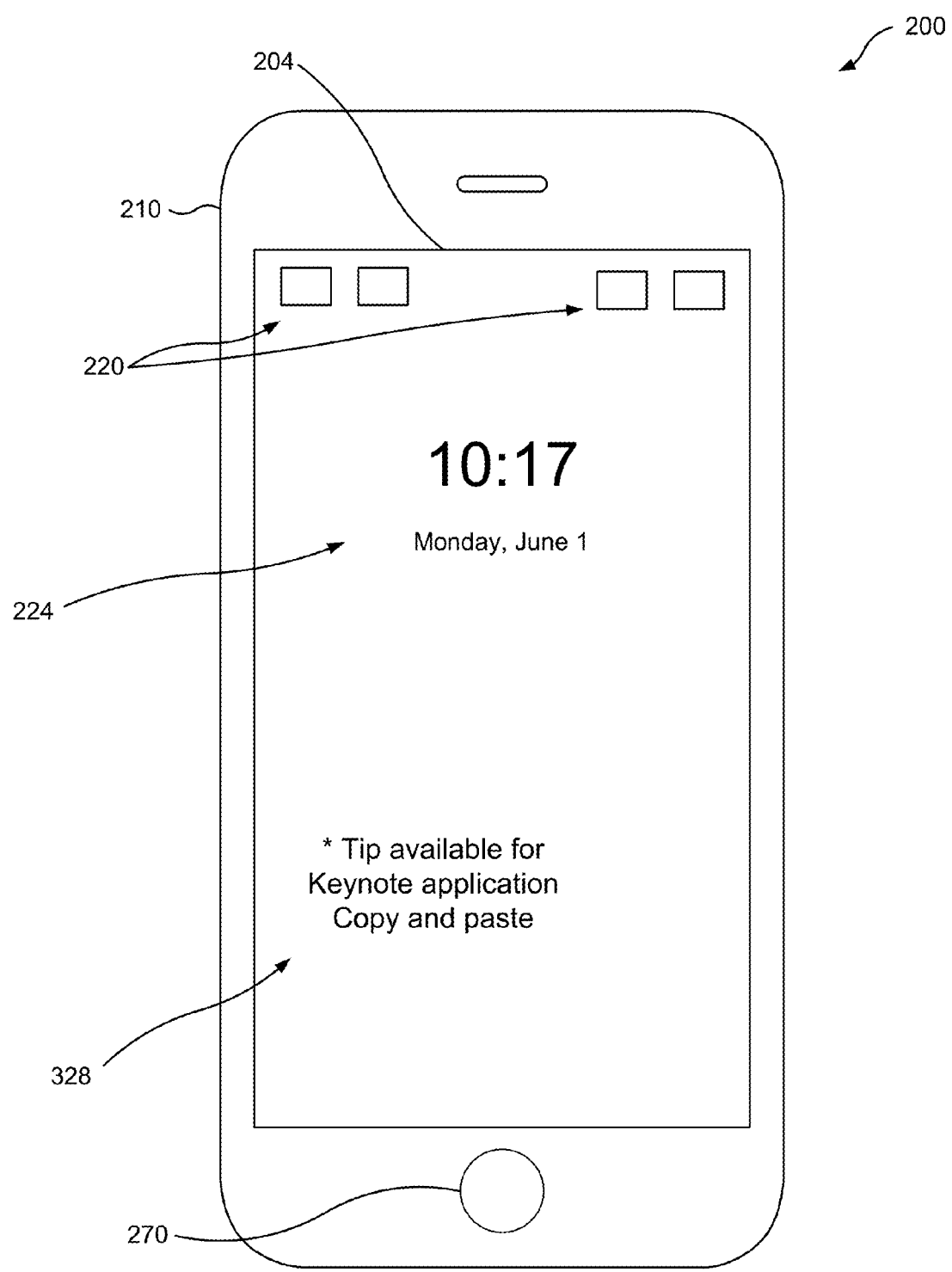
FIG. 3 is a representation of a client device showing a tip on a lock screen view according to embodiments of the present invention.

FIG. 3 shows the client device 200 when a tip notification is displayed on the lock screen. The only change from FIG. 2 is the addition of the tip notification 328 on the display screen, as illustrated in FIG. 3. In response to the notification 328, the user may choose to interact with the notification, by clicking, or tapping, on the notification or selecting it in a manner usual for a touchscreen display, or the user may simply ignore the notification, which will be deleted from the lock screen display after a predetermined interval of time. If the user interacts with the notification 328, then the device launches the tips application and shows the tip about which the notification was displayed, as well as other available tips.

Figure 4:
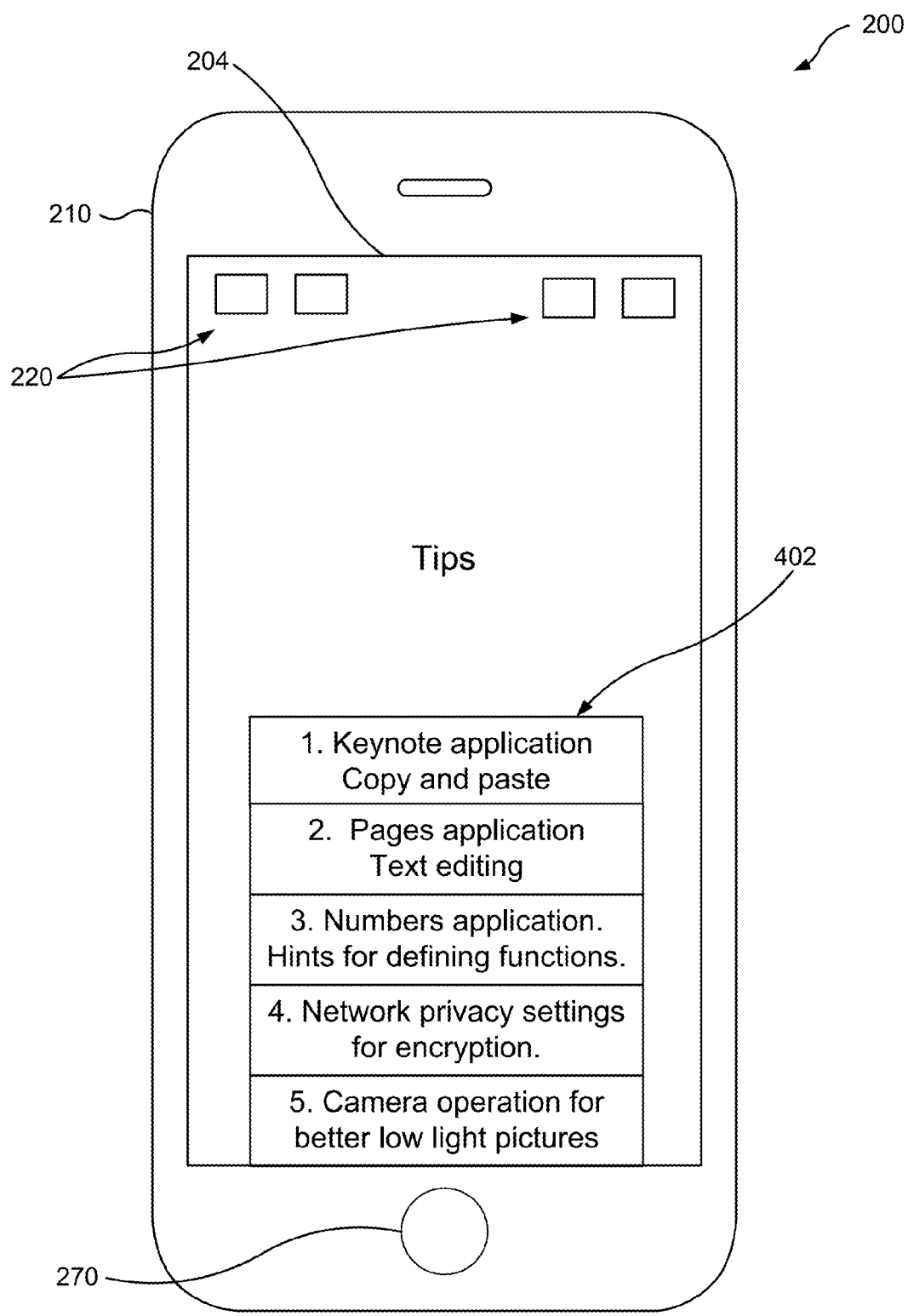
FIG. 4 is a representation of the FIG. 2 client device showing a tips application home screen view on the display screen.

FIG. 4 shows the device 200 after the user has interacted with the notification 328 on the lock screen (FIG. 3), in response to which the device launches the tip application of the device and shows the available tips in a list format 402 (FIG. 4). The exemplary list of tips in FIG. 4 shows that the tips may relate to functionality of various applications that might be installed on the device, such as "Keynote", "Pages", and "Numbers", as well as relating to resources that are available to the device, such as network settings and a device camera. The user may select any one of the tips that are displayed in the list 402. When the tip is selected, the tip application will retrieve the full text of the corresponding tip, either from device storage or from an alternate source, such as a network resource or a tip server. The user may scroll up and down the list, as desired. That is, it should be understood that more than the five tips visible in FIG. 4 may be available. The maximum number of tips that are visible in the list 402 can be a predetermined number that depends on the devices 200 and their configuration.

II. Obtaining Tips from the Server

Figure 5:
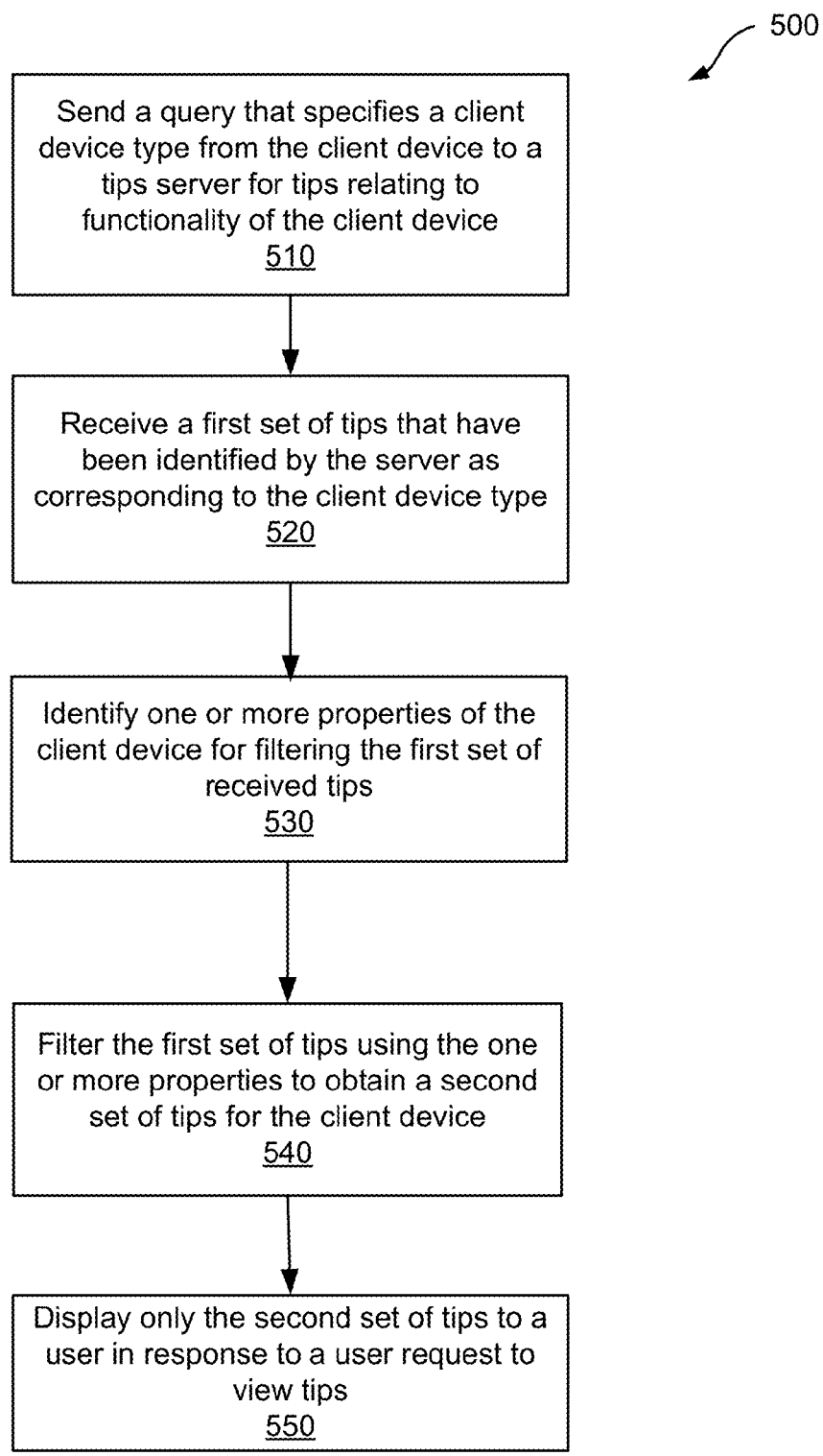
FIG. 5 is a flowchart of a method of client device operation for tips application functionality as described herein.

FIG. 5 is a flowchart of a method of client device operation for tips application functionality as described herein. The method 500 illustrated in FIG. 5 can be performed by one of the client devices 106, 110 illustrated in FIG. 1 and can be performed by other suitably configured computing devices with the capabilities discussed herein.

At the first box 510, the client device sends a query that specifies the client device type. The client device type, for example, maybe differentiate between devices, such as between a smart phone, a tablet computer, a laptop computer, an accessory device, or the like. The query is sent from the client device to the tip server, which will provide tips that relate to the functionality of the client device and assist in understanding the operation of the client device. Based on the received query, the server can retrieve relevant tips that match the client device, and can provide the retrieved tips to the client device. The client device can filter the provided tips according to one or more properties of the client device to eliminate tips that are not especially relevant, such as tips that relate to a different device type, a different operating system, an application that is not installed at the client device, a device feature that is not present or not enabled on the client device, and so forth.

At the box 520, the client device receives a first set of tips that have been identified by the tip server as corresponding to the client device type. In this way, the tip server will not send irrelevant tips to the client device. For example, if the client device is a smart phone, then the tip server will note that information in the query received from the client device, and the tip server will not send tips that relate to tablet computer configurations, but will send tips that relate to a smart phone. The client device will automatically self-identify its device type in the query message that it sends to the tip server. Each of the tips can include a tip identifier (tip ID), as well as one or more additional data fields, whose number and type of data depend on the tip ID and associated type of client device for which it is intended.

At the box 530, the client device identifies one or more client device properties for filtering the first set of received tips. In this operation, the client device can become aware of the device properties on which to filter the tips by examining a device database that contains a list of device properties. The device database can be maintained by the device operating system, so that the installation of new applications or software or hardware will be entered into the database and kept current. Maintaining the device properties within the device itself can make it unnecessary to send such information over a communications connection to the tip server and therefore helps to maintain security and privacy of information for the user. The client tips application can be configured so as to utilize device properties in filtering that are deemed most relevant to users. It is generally known to those skilled in the art which device properties should be identified as the most relevant in performing the filtering operation.

At the box 540, the client device filters the first set of tips in accordance with the identified client device properties, and obtains a second set of tips as a result of the filtering. The device properties, in the device database, provide an opportunity for greater discernment in selecting tips for the device. Such device filtering provides enhanced targeting of the tips, because the device properties offer greater granularity in comparing device characteristics. That is, tips may be filtered not just by device type, such as smartphone vs. tablet computer, but tips may now be filtered according to device characteristics and properties such as operating system version, model or version number of device type (e.g., iPhone 4, iPhone 5, iPhone 6), device resources such as maximum pixel density of a device camera, amount of memory, and the like. Thus, the result of the filtering operation 540 is a winnowing of the tips received from the tips server into a subset of received tips that provides an enhanced targeting of tips that are directed to specific client device characteristics.

At the box 550, the client device will display only the tips from the second set of tips, the set of enhanced targeted tips, in response to a user request to view the tips. That is, in accordance with the box 550 operation, the user has decided not to simply ignore the tip notifications and/or tips, and instead the user has interacted with the tips list to select a tip and to view the details of the selected tip. Therefore, in some embodiments, the tips application of the client device can permit only tips from the second set of tips, the targeted tips, to be displayed.

III. Initiating Tips Processing and Display of Notifications

Figure 6:
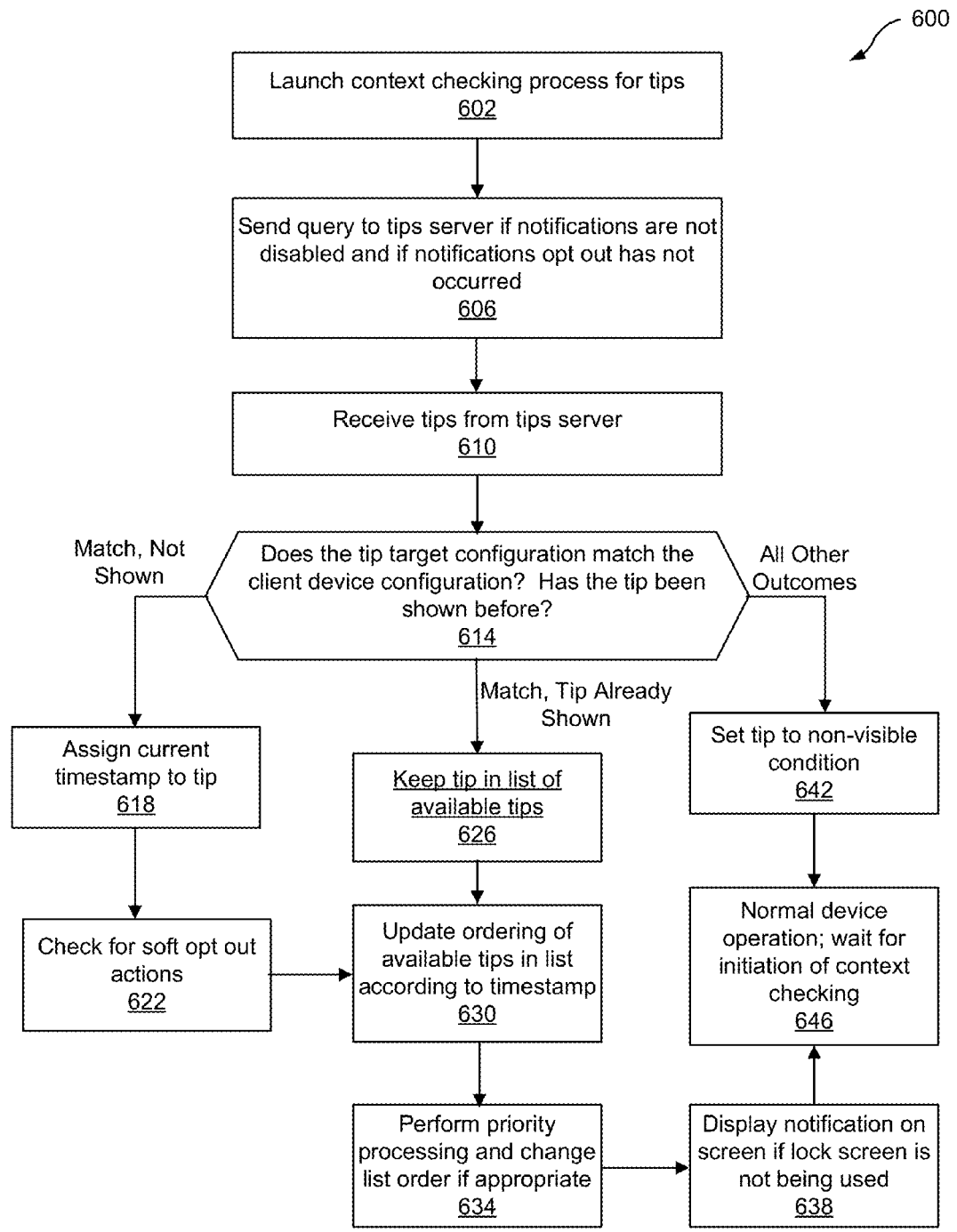
FIG. 6 is a flowchart of a method of client device operation for tips application functionality as described herein.

FIG. 6 is a flowchart of a method 600 of client device operation for tips application functionality with greater detail than has been described thus far. FIG. 6 and the discussion that follows relate to initiation of the tip queries sent to the tip server, management of tips already received at the client device from the server, and display (or lack thereof) for notifications for the tips.

At the box 602, a tip context checking process is launched. The context checking operation may be implemented as a background process, a process that launches upon startup of the device or application of charging voltage such as a connection to a power brick. The tip context checking process may comprise, for example, a process of the tip application, or may be integrated with the client device operating system. The tip context checking process automatically checks for tip updates from a tip server. The automatic checks performed by the tip context checking process may be initiated at predetermined intervals, such as daily or at a predetermined elapsed time since the last check, or the automatic checks may be initiated at opportune conditions, such as at every connection to a power brick, or at the start of a network session. The automatic tip context check may also be performed according to a combination of predetermined times and opportune conditions.

At the next operation, at the box 606, the client device sends a query to the tips server in accordance with the automatic context checking process noted above. If it is time for checking the tip context, and if notifications have not been disabled by the user, and if the user has not failed to respond to notifications so as to initiate a soft opt out condition as described further below, then the client sends the query to the tips server. A user may select a device setting that disables notifications from being displayed to the user. As part of the automatic tip context checking process, the client device checks for the notification-disabled setting. If the client device finds that notifications have been disabled, then the query will not be sent to the tips server. A "soft opt out" condition occurs when a user has refrained from selecting a tip notification or tip itself for viewing for several consecutive displays of the notification and/or tip. For example, three consecutive ignored notifications may initiate the soft opt out condition, so that, if a user receives three consecutive tip notifications and ignores them (i.e., no user selection or interaction of three consecutive tips), then the user is deemed uninterested in tips, and the client device stops sending the tips server any queries for tips.

At the box 610, because notifications have not been disabled and no soft opt out has occurred, the first set of tips are received at the client device from the tips server. Each of the tips received from the tips server includes a tip identifier (tip ID) and includes associated data fields that are associated with that tip ID and that specify additional features of the tip and the devices for which the tip is relevant. These data fields assist in the enhanced targeting of the tips. For example, the data fields of the tip may specify an operating system version number, or may specify a device model number or version number in addition to device type. The data fields may specify other features, such as an application name, an application version number, a date of publication of the tip, device capabilities, data flags, and the like. Each of these features may be used by the client device tip application to further refine and filter the set of tips received from the tip server so as to provide a more relevant, targeted second set of tips for display to the user.

At the box 614, the client device determines if the tip target configuration of the tip matches the client device configuration. For example, the device type identified in the query should match the device type associated with the tip itself. The client device also checks the tip data fields to determine if the tip has been flagged as visible, or if the tip has been flagged as non-visible. The client device itself is generally responsible for flagging a tip as non-visible. A tip flagged as non-visible will not be displayed, but may nevertheless be kept in the device. A typical reason for flagging a tip as non-visible is a condition in which, for example, the tip relates to an application identified in the tip data fields for which the client device has no installed application. That is, one of the data fields may name an application that the client device recognizes is not installed at the client device. The client device would therefore set a "visible" flag to "non-visible". Because the relevant application may yet be installed at a future date, the client device does not delete the tip, but keeps it in the device, albeit with a "non-visible" flag. As noted below, however, the client device will re-check tips in the client device to determine if a data field or flag should be changed. This would be the case where a tip relates to an application that is not currently installed, which causes a "non-visible" flag to be set, but then the subject application is later installed. Upon re-checking, the client device would determine that the configuration and properties of the client device have changed, so that the application is now installed at the device, and as a result the client device will change the visibility flag for the tip from "non-visible" to "visible". In the box 614 operation, the client device also checks to determine if the tip has been shown to the user. If the tip has been shown (i.e., has been viewed), then the client device sets a flag for the tip to reflect the viewed status.

If the tip and the device configuration match, so that the tip data fields and the device configuration and properties are consistent with each other, and if the tip is flagged as visible, and if the tip has not been shown, then processing continues from the box 614 to the box 618. At the box 618, a current timestamp value is assigned to the tip. The timestamp value is used for ordering the tips in a list. At the next box after the timestamp, at box 622, the client device checks for any soft opt out condition on the part of the user. As noted, a soft opt out occurs if the user fails to interact or select a notification for a predetermined number of consecutive displayed tip notifications, such as, for example, three consecutive displayed notifications. Selection of any notification by the user will terminate a soft opt out condition. Returning to the operation at the box 614, if the tip matches the client device configuration and if the tip is flagged as visible, but the tube has already been shown, then processing continues from the box 614 to the box 626, where the tip is kept in a list of available tips.

After the client device has determined there is no soft opt out condition at box 622, or has determined to keep the tip in the list of available tips at box 626, the tip processing continues at the box 630, where the client device updates the ordering of the available tips in the list. The client device will keep the list of available tips in data memory and will order the tips according to their timestamp value, which has been assigned at box 618. Thus, more recently received matching tips will move up in the list and older tips that have already been shown will effectively move down in the list, as a result of the box 630 processing. After the box 630 processing, the next operation comprises priority processing, at the box 634.

The priority processing of the box 634 involves determining the priority that has been assigned to a tip that was received from the tip server. In the illustrated embodiments, the client device can process up to five levels of priority. It should be understood that a greater number or lesser number of priority levels may be implemented. In the five-level implementation, the five levels comprise P1, a "high" level priority; P2, an elevated priority; P3, "normal" priority; P4, a low level priority, and P5, suppressed notification. For P1, the tip and the notification are both shown regardless of the opt-out condition and notification settings. The P1 level is reserved for the most critical of tips, which may comprise warnings. For the P2 priority shows the tip even if the user has ignored notifications and has entered a soft opt out condition, but does not show the tip if the user has disabled notifications in the device Settings panel. For the P3 priority, the default priority value, the tip is shown only if the user did not disable notifications in the Settings panel and if the user did not enter the soft opt out condition from ignoring notifications and tips. The P4 priority is reserved for special use cases. The P5 priority indicates to the client device that the notification and tip should not be displayed, but rather should be suppressed. Thus, depending on the priority value and combinations of data fields, the visibility flag may be changed from non-visible to visible.

At the box 638, the display notification for the tip is displayed on the device screen if the lock screen is not otherwise being used. That is, if no other notifications or alerts are being shown on the lock screen, then the client device may show the notification on the lock screen. If one of the box 614 conditions was satisfied and the priority processing was performed at box 634, then the display notification operation at the box 638 is performed. As described above, the notification operation 638 is performed and the notification is displayed only if the lock screen is empty.

At the box 614, if none of the configuration matching and shown conditions described above have been satisfied, then the "all other outcomes" applies, and processing continues from the box 614 to the box 642. At the box 642, the tips application sets the visibility flag value of the tip to "non-visible", so the tip will not be displayed. The tip, however, is not deleted from the list for this reason, but rather is kept in the list, in a dormant condition in terms of display. For example, if the tip relates to an application not installed at the client device, or relates to resources not available to the computing device, then the tip should not be displayed, because it is not relevant to the client device. Nevertheless, the application may be installed later, or the resource may be added to the device later. For this reason, the tip is simply set to "non-visible" and awaits a time when the tip will be matched to the device configuration, at which time the tip will be changed from "non-visible" to "visible", per the operation of the flows beginning at the box 618 and 626. Processing of the tip is then concluded, and examination of other tips may be performed, if additional tips remain.

After processing of selected tips is completed and the tips application installed at the client device is no longer actively being executed with the device user, the tips application will return to a quiet or dormant state, in which the tips application waits for the next client device context that initiates launch of the tips application and sending of the next query. As noted above, the query sending operation may occur at regular intervals, such as once every 24-hour period or within a time interval after the last user interaction, or the like, or the query sending operation may be initiated according to an opportune situation, such as recharging power is applied to the client device, or the client device is paired with another device, or power is applied to the client device after an "off" condition, or the like. Any combination of such conditions may be used to initiate the query operation by the tips application of the client device. The return to normal device operation and waiting for initiation of checking for tips is indicated at the box 646. When checking for tips is initiated, the operation of the client device returns to the box 602.

Figure 7:
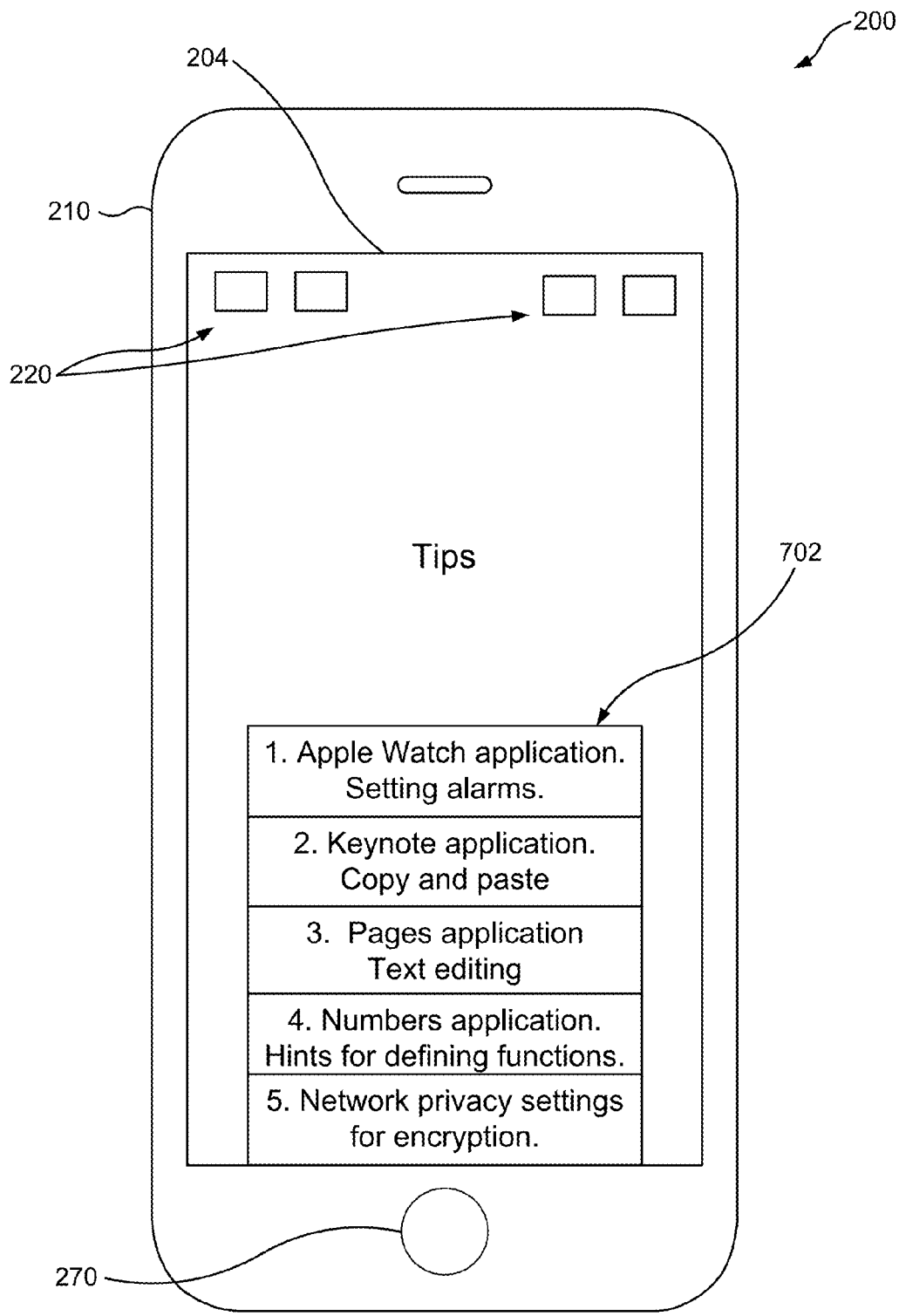
FIG. 7 is a representation of the FIG. 2 client device showing a tips application home screen view such as shown in FIG. 4, illustrating the display screen after installation of a new application.

FIG. 7 is a representation of the FIG. 2 client device showing a tips application home screen view such as shown in FIG. 4, with FIG. 7 illustrating the display screen after installation of a new application. As compared to FIG. 4, the screen display in FIG. 7 indicates that an "Apple Watch" application has been installed on the client device since the time of the FIG. 4 display (or, alternatively, the list in FIG. 7 indicates that an "Apple Watch" device has been paired with the client device since the time of the FIG. 4 display). That is, the installation (and/or pairing) of the "Apple Watch" application is evident by virtue of the list 702 of available tips.

FIG. 7 illustrates the operation of the Tips application as shown in FIG. 6. That is, at the box 614 (FIG. 6), prior to installation and/or pairing of the "Apple Watch" with the client device, the result of the comparison would be that a tip target configuration that included a tip that relates to an "Apple Watch" would be a configuration that does not match the client device configuration, which at the time would not have included the "Apple Watch". Therefore, the "All Other Outcomes" branch of the box 614 (FIG. 6) would apply, and the "Apple Watch" tip would have been set to non-visible. The tip itself, or alternatively a pointer or link representing the "Apple Watch" tip, would remain stored in the tip list 402 (FIG. 4) maintained by the client device, although the tip would not have been visible in the tip list. After the installation and/or pairing of the "Apple Watch" at the client device, however, as the client device tip application checks any new incoming tips as well as tips already in the tip list, the tip application of the client device would eventually reach the previously received "Apple Watch" tip, and then the flow through the box 618 and following would take precedence. The "Apple Watch" tip in the list would therefore be re-ordered to the top of the list, where it would be made visible in the list 702 and be available for selection by the user, to be viewed. In this context, the tips in the tip list 702 may also be referred to notifications, and selection of a tip by the user will result in the client device showing the full tip. In FIG. 7, it should be noted that the order of the tips has not changed, following the "Apple Watch" tip at the top of the list. Thus, the "Apple Watch" tip notification is followed by the "Keynote", "Pages", "Numbers", and "Network Settings" notifications in the list 702.

IV. Display of Tips after Lock Screen Notification

Figure 8:
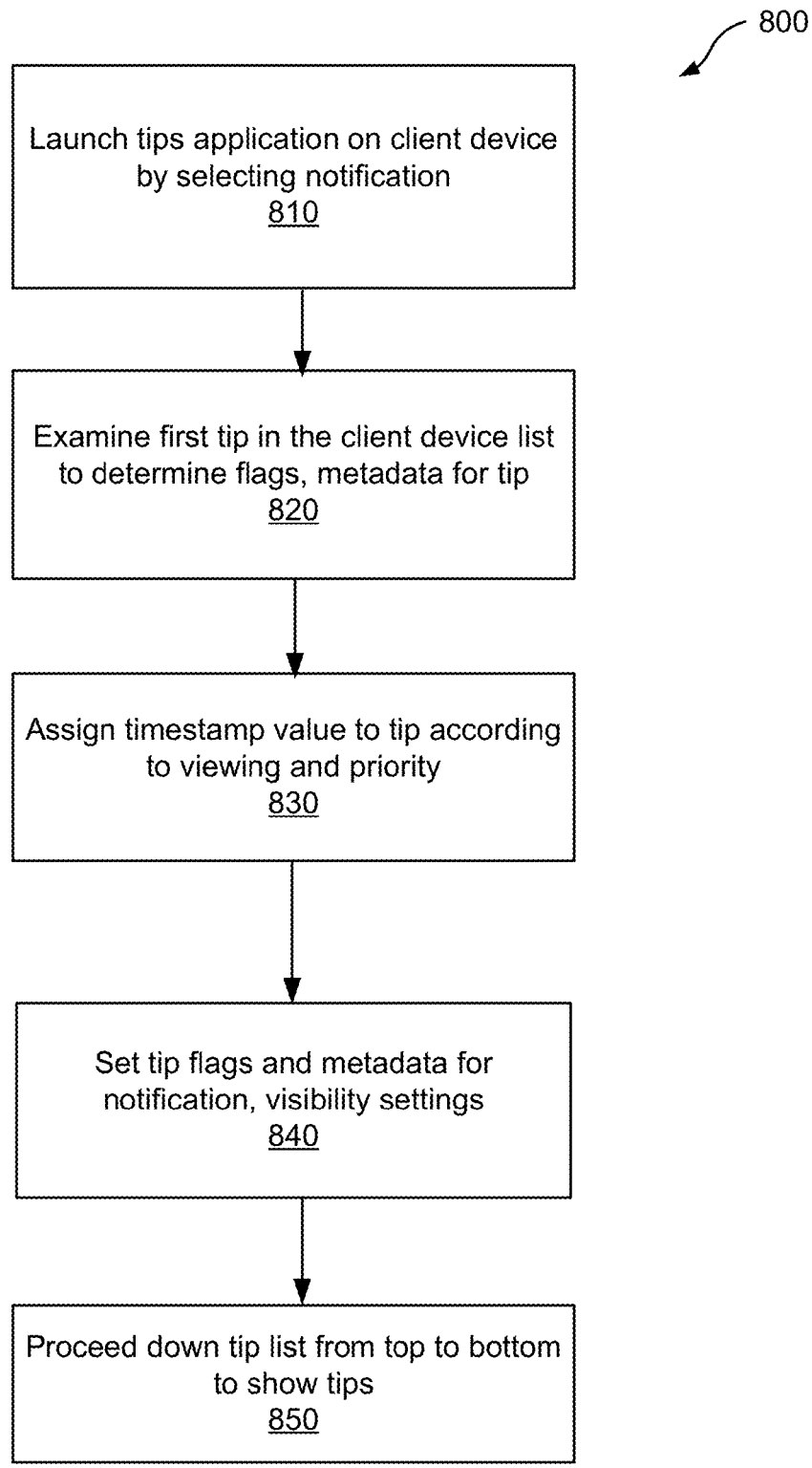
FIG. 8 is a flowchart of a method of client device operation for tips application functionality as described herein.

In the discussion above, it was noted that a notification that is made visible in the tip list is available for selection by the user, to be viewed. FIG. 8 is a flowchart of a method 800 that illustrates operation of the client device after the user has selected a notification from the lock screen display for viewing. That is, a notification is displayed on the lock screen of the client device, which is the operational state at the box 642 of FIG. 6, and which appears as in FIG. 4 and FIG. 7, whereupon the user may select one of the visible notifications in the tip list 402, 702.

Once the user selects a tip notification, then at the box 810 of FIG. 8 the launch of the tips application on the client device is initiated, by the action of the user selecting the notification on the lock screen. The client device operating system responds to the user selection of the notification by launching the tips application and/or making it active to the user.

At the box 820, the tips application examines the first tip in the client device tips list, such as the tips list 402 shown in FIG. 4. The tips application examines the list to determine the tip ID and data fields associated with the first tip, including flag values and metadata for the first tip. Because the notification was displayed on the lock screen (FIG. 6), the tip associated with the notification will necessarily be the tip located at the top of the tip list. The metadata associated with the tip includes device data, data fields values, and the like, as described above.

After the information relating to the tip ID and associated data fields has been examined by the tip application, the tip application assign a timestamp value to the tip according to the viewing, which would be the current time, and the priority value P1 through P5, as noted above. If the priority is an urgent priority, that is, P1, then the tip would have already been displayed, and is not pertinent for this operational sequence. The remaining priority levels, however, may be processed according to their associated actions. As noted above, such actions may include display that is conditional on a combination of user device settings and opt out conditions.

After the assignment of the tip timestamp and priority processing at the box 830, processing continues at the box 840 where the tip flag values are set and tip metadata (data fields) are set for appropriate notification actions and visibility settings (i.e., visible or non-visible). For example, as noted above, if a tip relates to an application that is not installed on the client device, then the client device will set that tip to a non-visible condition but will otherwise maintain the tip in the tip list. The tip will remain in the list, dormant, and the tip application will continue to note that the related application is not installed, so that the tip remains set to non-visible (see, e.g., FIG. 6). The tip will not be changed to "visible" until the client device properties result in the tip becoming relevant (i.e., there is a match between the tip and the device properties).

At the box 850, the tip application proceeds down the tip list, from top to bottom, in order of the tips. In this way, the tips application processes the tips in the tip list and shows tips, in accordance with the user selection.

V. Computing Device

Figure 9:
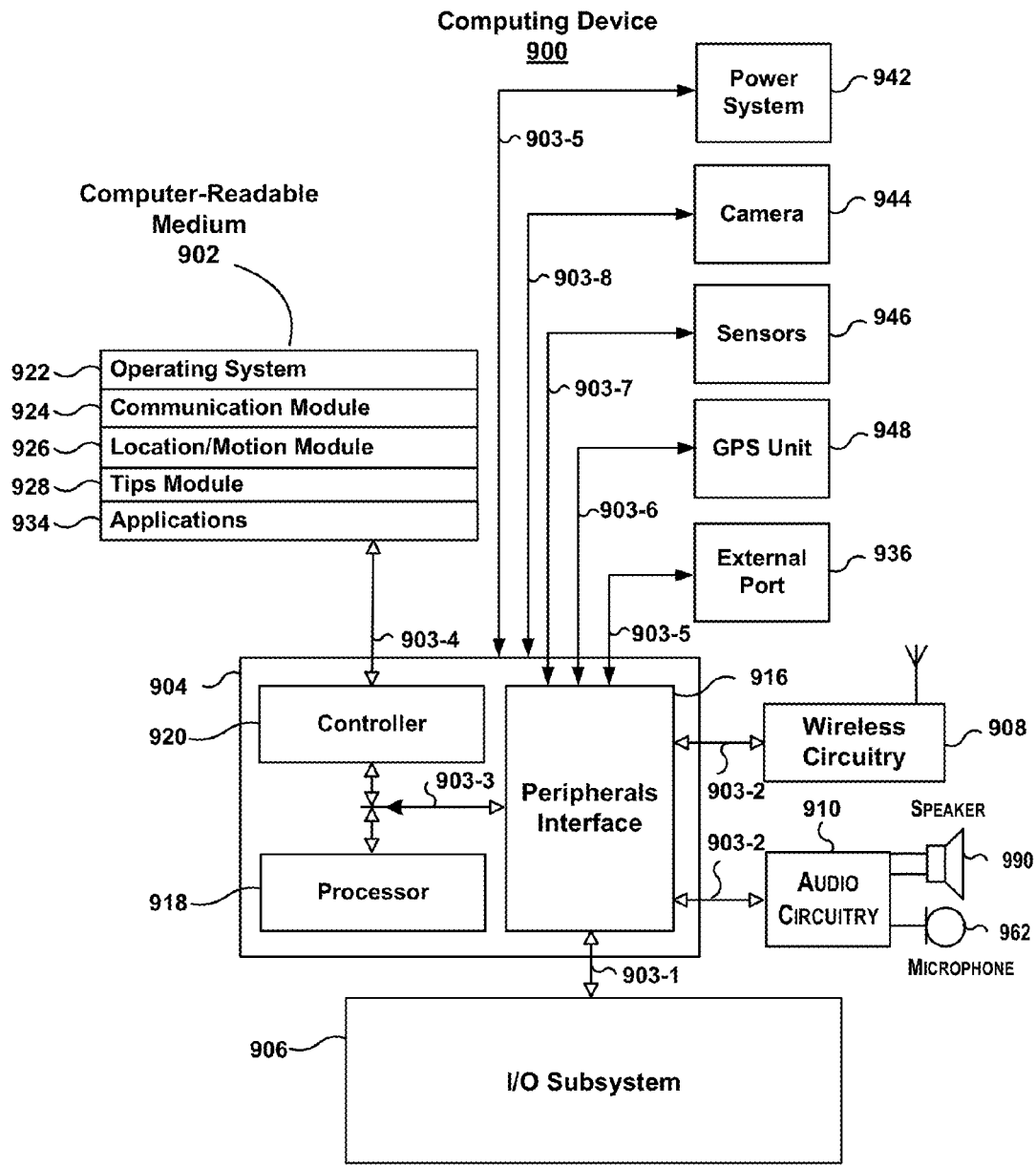
FIG. 9 is a block diagram of a computer processing system that may comprise any of the computing devices and may be used to provide the operation described herein.

FIG. 9 is a block diagram of a data processing system 900, which may be used with one embodiment of the invention. For example, the system 900 may be used as part of the server device 102 and/or the client devices 106, 110, as shown in FIG. 1. The system 900 generally includes a computer-readable medium 902, a processing system 904, an Input/Output (I/O) subsystem 906, wireless circuitry 908, and audio circuitry 910 including a speaker 990 and a microphone 952. These components may be coupled by one or more communication buses or signal lines 903. The device 900 can be any electronic computing device, including a wearable computer device, a handheld computer, a tablet computer, a desktop computer, a mobile phone, laptop computer, tablet device, media player, personal digital assistant (PDA), a key fob, a car key, an access card, a multifunction device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 9 is only one example of an architecture for the computing device 900, and that the device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some embodiments, the wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The wireless circuitry 908 is coupled to the processing system 904 via a peripherals interface 916. The interface 916 can include conventional components for establishing and maintaining communication between peripherals and the processing system 904. Voice and data information received by the wireless circuitry 908 (e.g., in speech recognition or voice command applications) is sent to one or more processors 918 via the peripherals interface 916. One or more processors 918 are configurable to process various data formats for one or more application programs 934 stored on the medium 902.

The peripherals interface 916 couples the input and output peripherals of the device to a processor 918 and the computer-readable medium 902. One or more processors 918 communicate with the computer-readable medium 902 via a memory controller 920. The computer-readable medium 902 can be any device or medium that can store code and/or data for use by one or more processors 918. The computer-readable medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, the peripherals interface 916, one or more processors 918, and the memory controller 920 can be implemented on a single chip, such as processing system 904. In some other embodiments, they can be implemented on separate chips.

The computing device 900 also includes a power system 842 for powering the various hardware components. The power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the computing device 900 includes a camera 944. In some embodiments, the computing device 900 includes sensors 946. The sensors can include accelerometers, compass, gyrometer, pressure sensors, audio sensors, light sensors, barometers, and the like. The sensors 946 can be used to sense location aspects, such as auditory or light signatures of a location.

In some embodiments, the computing device 900 can include a GPS receiver, sometimes referred to as a GPS unit 948. A computing device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the computing device. Based on these estimations, the computing device can determine a location fix, altitude, and/or current speed. A location fix can be geographical coordinates such as latitudinal and longitudinal information.

One or more processors 918 run various software components stored in the medium 902 to perform various functions for the computing device 900. In some embodiments, the software components include an operating system 922, a communication module (or set of instructions) 924, a location module (or set of instructions) 926, a Tips module 928, a synchronization module 930, and other applications (or sets of instructions) 934, such as a navigation app. The Tips module operates so as to send queries to the tips server and maintain a tip list and mange display of notification and tips, and the like, as described herein.

The operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 924 facilitates communication with other devices over one or more external ports 936 or via the wireless circuitry 908 and includes various software components for handling data received from the wireless circuitry 908 and/or external port 936. The external port 936 (e.g., USB, FireWire, Lightning connector, 30-pin connector, etc.) is adapted for coupling directly to other devices or indirectly over a network (e.g., the Internet, wireless LAN, etc.).

The one or more applications 934 on the computing device can include any applications installed on the computing device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 934 can also include a specific app for requesting continuity, controlling playback of content items, updating the content item database, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, the I/O subsystem 906 can include a display and user input devices such as a keyboard, mouse, and/or trackpad. In some embodiments, the I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem 906 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's computing device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method of providing tips to a user of a client device, the method comprising, at the client device:
   sending a query to a server for tips relating to functionality of the client device, the query specifying a device type of the client device;
   receiving a first set of tips, the first set of tips being identified by the server as corresponding to the device type of the client device;
   identifying one or more properties of the client device for filtering the first set of tips, the one or more properties including at least one of an operating system version number, an installed software application, a client device resource, or a client device version number;
   filtering the first set of tips using the one or more properties to obtain a second set of available tips for the client device;
   detecting a pairing of a second client device with the client device;
   sending a second query to the server for tips relating to functionality of the second client device, the second query specifying a device type of the second client device;
   receiving a third set of tips, the third set of tips being identified by the server as corresponding to the device type of the second client device;
   identifying one or more tips of the third set of available tips relating to a particular software application;
   determining whether the particular software application is installed on the second client device;
   when it is determined that the particular software application is installed on the second client device:
      displaying on the client device the one or more tips relating to the particular software application that is determined to be installed on the second client device based on a priority order assigned to the tips; and
   when it is determined that the particular software application is not installed on the second client device:
      not displaying the one or more tips relating to the particular software application;
      storing the one or more tips relating to the software application;
      subsequently checking to see whether the software application is later installed on the second client device;
      retrieving the stored one or more tips relating to the software application; and
      displaying on the client device the one or more tips relating to the software application when it is determined that the software application is installed on the second client device.

2. The method of claim 1, further comprising, at the client device:
   periodically sending queries to the server and determining the second set of available tips;
   tracking when tips are initially on the second set of available tips;
   identifying a first tip that is available at a first time, the first tip being generated by the server at a first generation time;
   identifying a second tip that is available at a second time, the second tip being generated by the server at a second generation time; and
   responsive to determining that the second time is more recent than the first time, displaying the second tip higher on a list than the first tip, wherein the first generation time is before the second generation time.

3. The method of claim 2, wherein the second tip relates to an application installed at the client device after the second generation time, such that the second tip is made visible to the user only after a third generation time that occurs after the second generation time.

4. The method of claim 1, wherein data relating to a plurality of tips is maintained in an ordered list at the client device.

5. The method of claim 4, wherein the client device manages visibility of the tips in the ordered list such that only tips that relate to one or more properties of the client device are made visible in the ordered list for viewing by the user.

6. The method of claim 4, wherein:
   the one or more properties relate to operational capabilities of the client device, and
   the data relating to the tips includes visibility data associated with a visibility flag, such that the visibility flag is set to "non-visible" to prevent displaying a received tip at the client device in response to the one or more properties of the client device not matching properties identified in data fields of the received tip.

7. The method of claim 6, further comprising, at the client device:
   periodically comparing one or more client device properties with the properties identified in the data fields of the received tip; and
   changing the visibility flag from "non-visible" to "visible" in response to the comparing identifying a match between the one or more client device properties and the properties identified in the data fields of the received tip.

8. The method of claim 1, wherein a tip comprises a tip identifier, a data field configured to identify a feature of a tip, and a data field identifying a device associated with the tip.

9. The method according to claim 1, wherein the one or more tips relating to the particular software application that is determined to be installed on the client device are displayed on a lock screen of the client device.

10. The method of claim 9 further comprising:
in response to displaying the one or more tips relating to the particular software application a predetermined number of times and not receiving a user selection of any of the one or more tips relating to the particular software application:
ceasing the sending of queries to the server for tips.

11. The method of claim 9, wherein the priority order assigned to the tips comprises one of a high priority, a normal priority and a low priority, and wherein a first tip having a high priority is displayed before a second tip having a normal priority and a third tip having a low priority.

12. The method of claim 9, wherein the priority order assigned to the tips comprises a time priority order, wherein a second tip arriving at a second time is displayed above a first tip arriving at a first time that is later than the second time.

13. The method of claim 9, further comprising in response to user selection of one of the displayed one or more tips relating to the particular software application that is determined to be installed on the client device that are displayed, launching the application corresponding to the selected tip.

14. A client device comprising:
one or more processors configured to:
send a query to a server for tips relating to functionality of the client device, the query specifying a device type of the client device;
receive a first set of tips, the first set of tips being identified by the server as corresponding to the device type of the client device;
identify one or more properties of the client device for filtering the first set of tips, the one or more properties including at least one of an operating system version number, an installed software application, a client device resource, or a client device version number;
filter the first set of tips using the one or more properties to obtain a second set of available tips for the client device;
detect a pairing of a second client device with the client device;
send a second query to the server for tips relating to functionality of the second client device, the second query specifying a device type of the second client device;
receive a third set of tips, the third set of tips being identified by the server as corresponding to the device type of the second client device;
identify one or more tips of the third set of available tips relating to a particular software application;
determine whether the particular software application is installed on the second client device;
when it is determined that the particular software application is installed on the second client device:
display on the client device the one or more tips relating to the particular software application that is determined to be installed the second client device based on a priority order assigned to the tips; and
when it is determined that the particular software application is not installed on the second client device:
not display the one or more tips relating to the particular software application;
store the one or more tips relating to the software application;
subsequently check to see whether the software application is later installed on the second client device;
retrieve the stored one or more tips relating to the software application; and
display on the client device the one or more tips relating to the software application when it is determined that the software application is installed on the second client device.

15. The client device of claim 14, wherein the one or more processors are further configured to:
periodically send queries to the server and determining the second set of available tips;
track when a tip is initially on the second set of available tips;
identify a first tip that is available at a first time, the first tip being generated by the server at a first generation time;
identify a second tip that is available at a second time, the second tip being generated by the server at a second generation time; and
responsive to determining that the second time is more recent than the first time, display the second tip higher on a list than the first tip, wherein the first generation time is before the second generation time.

16. The client device of claim 15, wherein the second tip relates to an application installed at the client device after the second generation time, such that the second tip is made visible to a user only after a third generation time that occurs after the second generation time.

17. The client device of claim 14, wherein data relating to a plurality of tips is maintained in an ordered list at the client device.

18. The client device of claim 17, wherein the client device manages visibility of the tips in the ordered list such that only tips that relate to the one or more properties of the client device are made visible in the ordered list for viewing by a user.

19. The client device of claim 17, wherein:
the one or more properties relate to operational capabilities of the client device, and
the data relating to the tips includes visibility data associated with a visibility flag, such that the visibility flag is set to "non-visible" to prevent displaying a received tip at the client device in response to the one or more properties of the client device not matching properties identified in data fields of the received tip.

20. The client device of claim 19, wherein the one or more processors are further configured to:
periodically compare one or more client device properties with the properties identified in the data fields of the received tip; and
change the visibility flag from "non-visible" to "visible" in response to the comparing identifying a match between the one or more client device properties and the properties identified in the data fields of the received tip.

21. A computer product comprising a non-transitory computer readable medium storing a plurality of instructions that when executed control a client device to provide tips to a user of the client device, the instructions comprising:
sending a query to a server for tips relating to functionality of the client device, the query specifying a device type of the client device;
receiving a first set of tips, the first set of tips being identified by the server as corresponding to the device type of the client device;

identifying one or more properties of the client device for filtering the first set of tips, the one or more properties including at least one of an operating system version number, an installed software application, a client device resource, or a client device version number;

filtering the first set of tips using the one or more properties to obtain a second set of available tips for the client device;

detecting a pairing of a second client device with the client device;

sending a second query to the server for tips relating to functionality of the second client device, the second query specifying a device type of the second client device;

receiving a third set of tips, the third set of tips being identified by the server as corresponding to the device type of the second client device;

identifying one or more tips of the third set of available tips relating to a particular software application;

determining whether the particular software application is installed on the second client device;

when it is determined that the particular software application is installed on the second client device:

displaying on the client device the one or more tips relating to the particular software application that is determined to be installed on the second client device based on a priority order assigned to the tips; and when it is determined that the particular software application is not installed on the second client device:

not displaying the one or more tips relating to the particular software application;

storing the one or more tips relating to the software application;

subsequently checking to see whether the software application is later installed on the second client device;

retrieving the stored one or more tips relating to the software application; and displaying on the client device the one or more tips relating to the software application when it is determined that the software application is installed on the second client device.

22. The computer product of claim 21, wherein the instructions further comprise:

periodically sending queries to the server and determining the second set of available tips;

tracking when a tip is initially on the second set of available tips;

identifying a first tip that is available at a first time, the first tip being generated by the server at a first generation time;

identifying a second tip that is available at a second time, the second tip being generated by the server at a second generation time; and responsive to determining that the second time is more recent than the first time, displaying the second tip higher on a list than the first tip, wherein the first generation time is before the second generation time.

23. The computer product of claim 21, wherein data relating to a plurality of tips is maintained in an ordered list at the client device, and wherein:

the one or more properties relate to operational capabilities of the client device, and the data relating to the tips includes visibility data associated with a visibility flag, such that the visibility flag is set to "non-visible" to prevent displaying a received tip at the client device in response to the one or more properties of the client device not matching properties identified in data fields of the received tip.

24. The computer product of claim 23, wherein the instructions further comprise:

periodically comparing one or more client device properties with the properties identified in the data fields of the received tip; and changing the visibility flag from "non-visible" to "visible" in response to the comparing identifying a match between the one or more client device properties and the properties identified in the data fields of the received tip.

* * * * *

UNITED STATES PATENT AND TRADEMARK OFFICE
CERTIFICATE OF CORRECTION

PATENT NO. : 10,356,188 B2
APPLICATION NO. : 14/727697
DATED : July 16, 2019
INVENTOR(S) : Kirill Novitchenko and Kyle W. Lu Page 1 of 1

It is certified that error appears in the above-identified patent and that said Letters Patent is hereby corrected as shown below:

In the Claims

Claim 14, Column 17, Line 58: insert --on-- after "is determined to be installed"

Signed and Sealed this
Twentieth Day of August, 2019

Andrei Iancu
*Director of the United States Patent and Trademark Office*